UNITED STATES PATENT OFFICE.

GUSTAV SCHWEIKERT, OF VIENNA, AUSTRIA-HUNGARY.

METHOD OF REVIVIFYING OR RESTORING PERMUTIT.

1,054,460. Specification of Letters Patent. Patented Feb. 25, 1913.

No Drawing. Application filed November 15, 1912. Serial No. 731,597.

*To all whom it may concern:*

Be it known that I, GUSTAV SCHWEIKERT, subject of the Emperor of Germany, residing at Vienna, Austria-Hungary, have invented certain new and useful Improvements in the Method of the Revivifying or Restoring of Permutit, of which the following is a specification.

The water purifying substance known in commerce under the name of permutit, consisting chiefly of sodium-aluminum-silicate, has proved itself excellent for the softening of water, as much so for the feeding of boilers—as for bleach-works, dye-works, laundries, etc. As permutit after a short use loses its power, it has to be revivified or restored, due to the fact that the permutit (sodium aluminum silicate) reacts with the alkaline earth metal compounds in the water to form double silicates of the alkaline earth metals and aluminum and in order to revivify the used permutit, it is necessary to again substitue alkali metal for the alkaline earth metals so taken up. On using the methods hitherto known for revivifying or restoring permutit a further revivifying or restoring was necessary after a rather short use. The revivifying or restoring method used till now required for example, six revivifyings per week, and with 300 kg. permutit only 20 cbm. of water of 20° German hardness could be softened when a fresh revivifying or restoring was necessary.

Whenever attempts were made to revivify or restore permutit with warm brine, the results were unsatisfactory because the warm brine was poured onto the cold permutit. The brine cooled to such a degree in passing through the upper layers of permutit, that the lower layers of permutit were not revivified or restored as the requisite temperature for the reaction between the sodium chlorid and the alkaline earth silicate was not reached throughout the mass of material.

According to the present invention the whole permutit mass—during revivifying or restoring is kept at the requisite reaction temperature, the hot brine being added in such quantities that all the permutit granules are covered with it and left in close contact therewith for a considerable time.

According to the present discovery a thorough revivification or restoration of the pemutit mass is achieved and the revivified or restored permutit will remain active for several days. With the revivified or restored permutit 60 cbm. of water of 20° German hardness will be softened by 300 kg. of permutit, which is treble the quantity of water softened by using permutit revivified or restored by the hitherto known methods. Thus the working costs of the revivifying or restoring process are reduced to one third of that required by the processes previously employed.

In carrying out the present invention the permutit, which has become no longer active for softening water by long use is heated throughout its mass to 70-100° C. This can be achieved either by passing large quantities of hot water through the vessel containing permutit, by blowing in live steam, by a steam jacket or by any other method. A solution of salt boiling or heated to about 90° C. is then passed through the permutit so that the salt comes in contact with all the permutit granules, and the permutit is revivified by reaction between the calcium aluminum silicate and the sodium chlorid, producing sodium aluminum silicate (permutit), and the alkaline earth metal is converted into a soluble salt. This is most simply accomplished by covering the vessel containing the brine and permutit and on stirring the permutit mass a uniform and thorough revivification or restoration is obtained.

It is of course obvious that other materials besides sodium chlorid may be used in making the brine, or solution used for reacting on the spent permutit, but these other materials are alike in these respects, that they are all salts of an alkali metal and an acid, the alkaline earth metal salt of which is readily soluble.

I claim:—

1. A process of revivifying permutit which comprises heating the entire mass of permutit to a temperature not lower than approximately 70° C., and then treating the mass with a solution of an alkali metal chlorid at approximately the same temperature.

2. A process of revivifying permutit which comprises heating the entire mass of permutit to 90° to 100° C., and then treating the mass with a solution of an alkali metal chlorid at approximately the same temperature.

3. A process of revivifying permutit which comprises heating the entire mass of permutit to a temperature not lower than approximately 70° C., and then bringing all portions of the mass of permutit into contact with a solution of an alkali metal chlorid at approximately the same temperature.

4. A process of revivifying permutit which comprises heating the entire mass of permutit to a temperature not lower than approximately 70° C., and then treating the mass with a solution of an alkali metal chlorid at approximately the same temperature, allowing the solution to remain in contact with the permutit until the latter is revivified.

5. A process of revivifying permutit which comprises heating the entire mass of permutit to a temperature not lower than approximately 70° C., and then treating the mass with a solution of sodium chlorid at approximately the same temperature.

6. A process of revivifying spent permutit which comprises treating the latter, in a heated condition with hot brine.

7. A process of revivifying spent permutit which comprises treating the latter, in a heated condition with a heated solution of an alkali metal salt of an acid, the alkaline earth metal salt of which is readily soluble.

In testimony whereof I affix my signature in presence of two witnesses.

GUSTAV SCHWEIKERT.

Witnesses:
 JOSEF BAUER,
 AUGUST FUGGER.